Jan. 14, 1936.  S. W. IRELAND  2,027,481
PERCOLATOR
Filed April 10, 1935
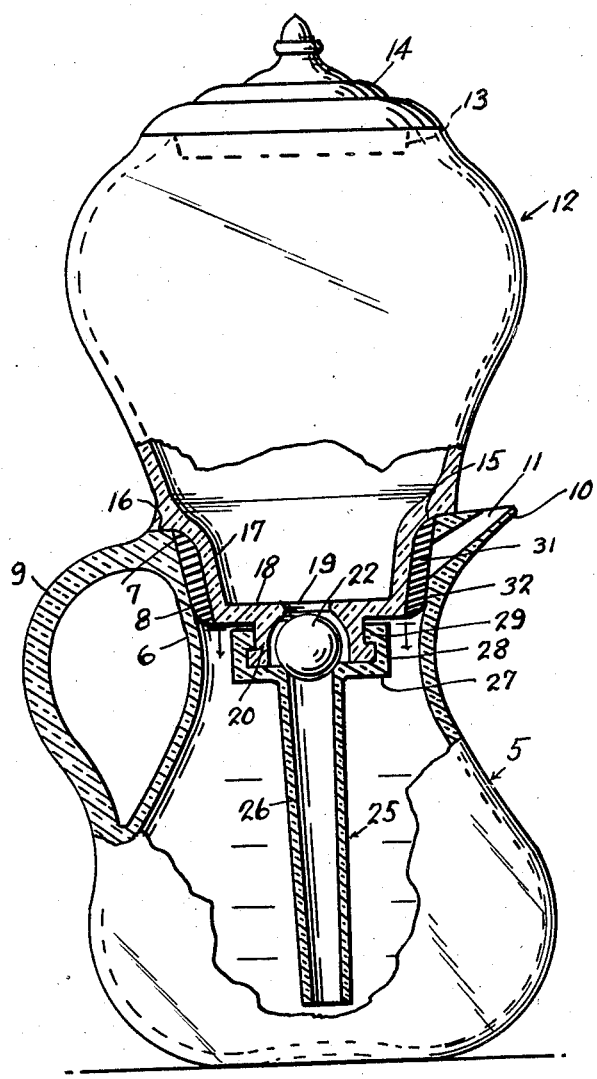
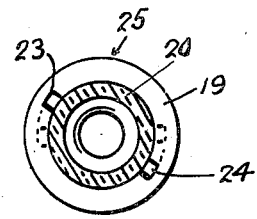
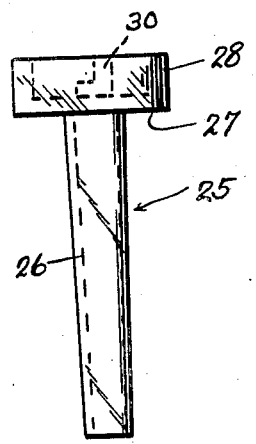
Inventor
S. W. Ireland
By Clarence A. O'Brien
Attorney Patented Jan. 14, 1936

2,027,481

UNITED STATES PATENT OFFICE 2,027,481

PERCOLATOR

Samuel W. Ireland, Atlantic City, N. J.

Application April 10, 1935, Serial No. 15,679

1 Claim. (Cl. 53—3)

My invention relates generally to devices for brewing, and particularly to a percolator especially adapted for brewing coffee, tea, and other beverages, and an important object of my invention is to provide a device of this character which is devoid of metallic portions detrimentally exposed to the brew.

Another important object of my invention is to provide a device of the character indicated which is of greatly simplified construction, which is more sanitary and more readily cleaned and kept in such a condition so as to avoid tainting or otherwise undesirably affecting the result of the brewing operations conducted therein.

Another important object of my invention is to provide a device of the character indicated which is composed substantially wholly of heat resisting vitreous material such as heat resisting glass, and which is so constructed as to be highly resistant to fracture and breaking in service or when being assembled together.

Another important object of my invention is to provide in a device of the character indicated above structural means which desirably controls the rate of mingling of the liquid element with the solid element to be acted upon, whereby the greatest natural benefits and flavors are extracted and produced for drinking purposes, and " grounds " are prevented from becoming mingled with the resultant brew.

Other important objects of my invention will be apparent from a reading of the following description in connection with the drawing, wherein for purposes of illustration I have shown a preferred embodiment of my invention.

In the drawing—

Figure 1 is a side elevational view of an embodiment showing a portion thereof in longitudinal vertical section.

Figure 2 is a horizontal sectional view taken through Figure 1 approximately on the line 2—2 and looking downwardly in the direction of the arrows.

Figure 3 is a side elevational view of the removable percolator tube.

Referring in detail to the drawing, the numeral 5 generally designates the lower vessel which is made preferably of heat resisting glass or the like in the general form of a pitcher, although other forms may be used incorporating the main features described below. The upper end of the vessel 5 has an outwardly tapered neck portion 6 which has a greater interior diameter at the point 7 than at the point 8. Affixed to the exterior of the vessel between the neck and the lower body portion thereof is the handle 9 and diametrically opposite this is the spout 10 which has a declining passage 11 which opens through the inner side of the neck between the points 7 and 8. The vessel 5 has a flat bottom or other similar arrangement enabling self-support on a flat surface.

The upper vessel which is generally designated 12 is of suitable globular form and is preferably made of material similar to that used in the construction of the lower vessel 5. The upper end of the upper vessel 12 has an opening 13 in which is adapted to be seated the plug closure 14. The lower end of the vessel 12 is curvedly reduced as indicated at 15 to define the shoulder 16. Below the curvedly reduced part 15 is the still further reduced downwardly tapering part 17 which is provided at its lower end with a bottom 18 which has an opening 19. Surrounding the opening 19 and depending from the bottom 18 is the collar 20 which forms a chamber 21 having its curved upper walls merging into the opening 19 and forming a retainer for the stopper ball 22.

Diametrically opposite sides of the neck 20 have laterally outstanding lugs 23 and 24.

The removable percolator tube 25 is composed of the downwardly tapering glass or other suitable material tube 26 which has integrally formed on its upper end the horizontal annular flange 27 from the periphery of which rises the circular wall 28 which on its upper end has the radially inwardly extending flange 29 which is provided at two diametrically opposite points with L-shaped openings 30 forming bayonet slots for the bayonet lugs 23 and 24. When the lugs are engaged with the bayonet slots and the percolator tube turned in the proper direction relative to the upper vessel 12, the percolator tube 25 is locked onto the collar 20 in the position illustrated in Figure 1.

The stopper ball 22 which is preferably made of glass, is of a smaller diameter than the greatest diameter of the chamber, but has a diameter larger than the diameter of either of the opening 19 or of the upper end of the bore of the tube 26; and the ball normally seats upon and closes the upper end of the tube 26 in the position shown in Figure 1.

In using the device of the invention the lower vessel 5 is filled with the desired amount of water (in the brewing of coffee), and the desired amount of solid coffee is placed on the bottom 18 of the upper vessel. Some of the solid coffee then rests in the chamber and on the ball 22, but is prevented from coming through the tube 26 by the position of the ball 22. The upper vessel, with the percolator tube assembled thereto in the manner indicated, is then placed in the lower vessel 5 so that the shoulder 16 rests on the top of the upper end of the lower vessel, and so that the conforming rubber or other suitable material packing washer 31 has its upper conformingly curved end engaged with the curvedly reduced portion 15 of the upper vessel and with the interior of the opening in the lower vessel, so as to positively pack the joint between the upper and lower vessels. The lower end of the washer 31 is curvedly formed so as to facilitate entry of the upper vessel into the lower vessel, the washer usually being more or less permanently fixed to the tapering reduced portion 17 of the upper vessel. It will be noted that the washer closes the passage 11 in the spout 10.

It is to be noted that when the device of the invention is used as a drip coffee pot, the washer 31 is dispensed with as well as the cover 14 for the upper vessel. The lower end of the percolator tube 26 is disposed close to but spaced above the bottom of the lower vessel 5.

Various dimensions can be readily worked out especially as to the height of the reduced neck portion of the upper vessel and the diameter thereof as well as the diameter of the upper end of the lower vessel and the diameter of the opening 19 and the diameter of the percolator tube, so that a perfect coaction is obtained between the rate of transfer of the heated water from the lower vessel during the brewing and the amount of coffee in solid form in the upper vessel; as well as in the proportioning of the interior capacity of the upper vessel to that of the lower vessel so that the most efficient vacuum conditions will be produced in the operation of the device of the invention; so that the most efficient brewing will take place and the finest values of the coffee or the like obtained in the brew.

When the water which has been placed in the lower vessel 5 has become sufficiently heated, some of the water will push upwardly through the percolator tube 25 and in so doing displace the stopper ball 22 and pass up into and mingle with the coffee in solid form which is resting on the bottom 18 of the upper vessel. When substantially all of the water has in this manner become transferred from the lower vessel into the upper vessel, the lower vessel is withdrawn from the source of heat. After a minute or two, the fall in the temperature in the lower bowl will result in a change of pressure which will cause a strong suction to be exerted from the lower bowl which pulls the brewed liquid downwardly again with sufficient force to displace the stopper ball 22 and permit the brew to pass into the lower vessel 5. The pull exerted on the ball 22 by the downwardly passing brew is sufficient to produce such a close lying relationship between the ball 22 and the upper end of the percolator tube as will positively prevent any of the coffee "grounds" from following the brew into the lower receptacle, so that the clarity of the brew thus passed into the lower receptacle is perfect. A filter cloth may be used between the percolator tube and the upper vessel, if desired.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claim.

What is claimed is:—

A percolator of the character described, comprising a lower vessel designed for heat exchange relationship to a source of heat, an upper vessel having a portion arranged to seat in an opening in the lower vessel, a gasket sealing the vessels, the bottom portion of said upper vessel having a centrally disposed aperture therein and a depending collar surrounding said aperture, spaced bayonet lugs on said collar, a percolator tube having on its upper end portion an integral annular flange and an upstanding circular wall having inwardly extending flanges provided with L-shaped bayonet slots, said lugs being received in said bayonet slot for removably locking the percolator tube to the bottom portion of the upper vessel, and the upper portion of said tube and the depending collar forming a chamber, a suction and fluid pressure operated valve in said chamber, normally closing the upper end of the percolator tube and adapted to close the aperture in the bottom of the upper vessel in communication with the percolator tube.

SAMUEL W. IRELAND.